G. M. MILNER.
EXPOSURE METER.
APPLICATION FILED JULY 16, 1917.
1,284,744.
Patented Nov. 12, 1918.
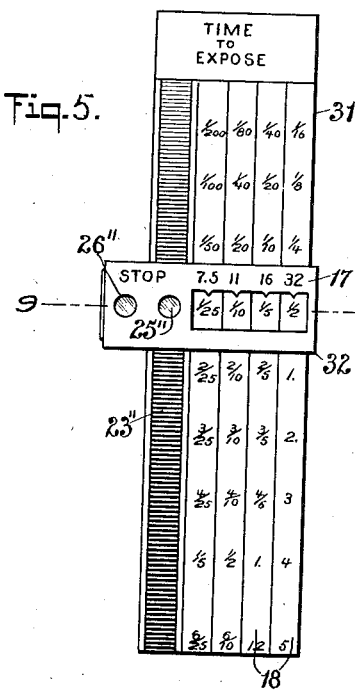
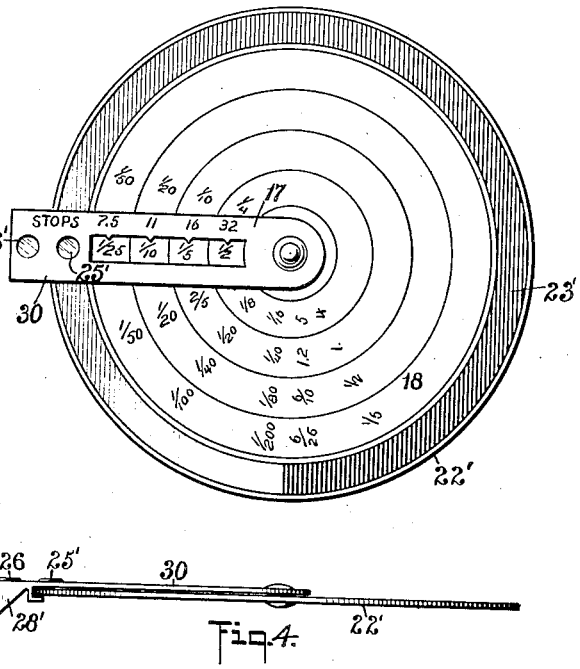
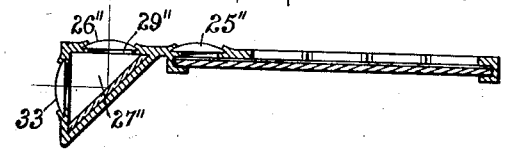
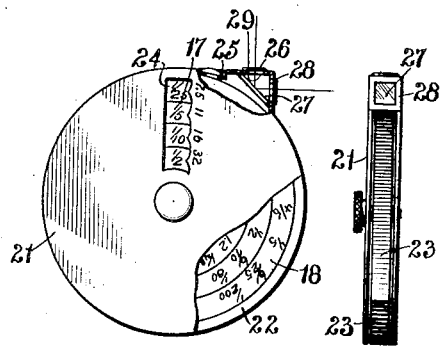
WITNESSES
INVENTOR
G. M. Milner
BY
ATTORNEYS

UNITED STATES PATENT OFFICE.

GUY MELVILLE MILNER, OF SALT LAKE CITY, UTAH.

EXPOSURE-METER.

1,284,744.     Specification of Letters Patent.     Patented Nov. 12, 1918.

Application filed July 16, 1917. Serial No. 180,789.

*To all whom it may concern:*

Be it known that I, GUY M. MILNER, a citizen of the United States, and a resident of Salt Lake City, in the county of Salt Lake and State of Utah, have invented a new and Improved Exposure-Meter, of which the following is a full, clear, and exact description.

My invention relates to photograph exposure meters and has reference more particularly to a meter whereby the intensity of actinic light may be compared with the standard shaded or colored surface with which suitable scales are associated for indicating the exposure.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of an exposure meter having a portion of its housing broken to show the details;

Fig. 2 is an edge elevation of the meter shown in Fig. 1;

Fig. 3 is a modified structure of the exposure meter shown in Fig. 1;

Fig. 4 is an edge elevation of the meter shown in Fig. 3;

Fig. 5 is a front elevation of a further modification of the exposure meter; and Fig. 6 is a cross section on line 6—6, Fig. 5.

Referring to the drawings, in Figs. 1 and 2 the housing 21 is a shallow housing. It receives therein a disk 22 the periphery of which is provided with a shaded strip 23 the density of which varies, as will be seen from Fig. 5, the disk being revoluble in the housing 21. The scale of diaphragm openings 17 is provided on the housing 21, while the scales 18 for times of exposure are provided on the disk, the housing 21 having an aperture 24 at the scale 17 through which the register of the scales 18 with the scale 17 is seen. The housing 21 carries a transparent colored member 25 disposed over the shaded strip 23. It has also a similar colored transparent member 26 disposed by the side of the member 25 and through which light is reflected by a reflector 27 incased in an extension 28 of the housing 21. A special color screen 29 is interposed between the transparent member 26 and the reflector 27, said color screen being adapted to vary in shade according to the intensity of light passing therethrough. The shade resulting from the light passing through the color screen 29 is then matched on the shaded strip 23 through the color screen 25 by moving the disk in the housing. When the shades are apparently alike the desired exposure of time may be found on the scales 17 and 18.

In Figs. 3 and 4 respectively the shaded strip 23' is formed at the margin of one of the faces of the disk 22'. The scales 18 are formed in a manner similar to that shown in Figs. 1 and 2 respectively. The scale 17, on the other hand, is provided on an arm 30 which is pivoted in the center of the disk. The arm carries a colored transparent member 25', and on the side of it a transparent colored member 26' which is housed in an extension of the arm 28' which accommodates the reflector and screen through which the light passes and whereby its color is affected so as to be imaged with the strip 23'.

In the structure shown in Figs. 5 and 6 respectively the shaded strip 23" extends longitudinally of an elongated member 31. The scales 18 run alongside the strip 23", while the scale 17 is formed on a slide 32 moving along the member 31. This slide carries a transparent colored member 25" and by the side of it a transparent member 26" located in the extension of the slide. Below this transparent colored member 26" there is a color screen 29" (see Fig. 6) and below it a reflector 27", which is preferably a prism and to which light is admitted through a screened aperture 33 in the extension of the slide.

I claim:

1. A time-exposure meter of the class described comprising,—a shaded strip, a transparent color screen which is adapted to be affected by the quantity of light passing therethrough and whereby the shade of same is varied, means associated with said strip whereby the shade of same may be matched with that of the screen, and scales fixed relatively to the strip and disposed coöperatively to said means substantially as and for the purpose set forth.

2. A time-exposure meter of the class described comprising a member having a shaded strip the density of which varies, a color screen the shade of which is adapted to be affected by the rays of light, means for said color screen to maintain the same in proximity to the strip and whereby the shade of said screen and that of the strip may be matched, and scales associated with said screen and strip substantially as and for the purpose set forth.

3. A time-exposure meter of the class described comprising,—a member having a nontransparent shaded strip the density of which varies, a carrier adjustable along the shaded strip, a color screen on the carrier, said color screen adapted to be affected by the rays of light and with which the shade of the strip is to be matched, and scales associated with said carrier and shaded strip.

4. A time-exposure meter of the class described comprising,—a member having a shaded strip the density of which varies uniformly, a member adjustable along the shaded strip, a light reflector on said carrier, a color screen through which the reflected light is adapted to pass, said color screen being affected by the rays of light so that its shade can be matched with the shade of the strip, and coöperating scales associated with the carrier and strip.

GUY MELVILLE MILNER.